(12) United States Patent
Goto

(10) Patent No.: US 7,533,559 B2
(45) Date of Patent: May 19, 2009

(54) ENGINE KNOCKING DETECTION APPARATUS WHICH ADJUSTS PASSBAND OF SENSOR SIGNAL BANDPASS FILTER IN ACCORDANCE WITH INCREASES IN CRANKSHAFT ANGLE

(75) Inventor: Takahiro Goto, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 228 days.

(21) Appl. No.: 11/293,224

(22) Filed: Dec. 5, 2005

(65) Prior Publication Data

US 2006/0117834 A1 Jun. 8, 2006

(30) Foreign Application Priority Data

Dec. 6, 2004 (JP) ............................. 2004-353144

(51) Int. Cl.
*G01L 23/22* (2006.01)
(52) U.S. Cl. .................................... 73/35.09
(58) Field of Classification Search ............... None
See application file for complete search history.

(56) References Cited

U.S. PATENT DOCUMENTS

| | | | |
|---|---|---|---|
| 3,942,359 A * | 3/1976 | Arrigoni et al. ............. | 73/35.09 |
| 4,314,534 A * | 2/1982 | Nakajima et al. ............ | 123/438 |
| 4,644,918 A * | 2/1987 | McDermott ............ | 123/406.37 |
| 5,343,843 A * | 9/1994 | Hamren ................. | 123/406.38 |
| 5,996,398 A | 12/1999 | Schleupen et al. | |
| 6,867,691 B2 | 3/2005 | Nishimura | |
| 2005/0261821 A1 * | 11/2005 | Abe et al. ................... | 701/111 |

FOREIGN PATENT DOCUMENTS

| | | | |
|---|---|---|---|
| EP | 0 539 071 | * | 4/1993 |
| JP | 5-30664 | | 2/1993 |
| JP | 5-288114 | | 11/1993 |
| JP | 5-306645 | * | 11/1993 |
| JP | A-H06-505805 | | 6/1994 |
| JP | 2002-47994 | | 2/2002 |
| JP | 2002-364449 | | 12/2002 |
| JP | A-2003-278592 | | 10/2003 |

OTHER PUBLICATIONS

Official Communication dated Feb. 3, 2009 in Patent Application No. JP 2004-353144 with English translation.

* cited by examiner

*Primary Examiner*—Robert R Raevis
(74) *Attorney, Agent, or Firm*—Nixon & Vanderhye PC

(57) ABSTRACT

In an engine knocking detection apparatus that receives a knocking sensor signal expressing vibration in an internal combustion engine and performs bandpass filter processing of the sensor signal to extract a signal component indicative of engine knocking, during each of respective combustion stroke intervals, the center frequency and/or width of the filter passband is adjusted in accordance with changes that occur, during each combustion stroke interval, in the distribution of sensor signal components that are characteristic of knocking.

34 Claims, 10 Drawing Sheets

| | | 105 | |
|---|---|---|---|
| ATDC | 0°~10° | 10°~20° | 20°~180° |
| | 180°~190° | 190°~200° | 200°~360° |
| | 360°~370° | 370°~380° | 380°~540° |
| | 540°~550° | 550°~560° | 560°~720° |
| CONTROL SIGNAL PRODUCED FROM CONTROLLER 103 | S1 | S2 | S3 |

| | 0°~10° | 10°~20° | 20°~180° |
|---|---|---|---|
| ATDC | 180°~190° | 190°~200° | 200°~360° |
| | 360°~370° | 370°~380° | 380°~540° |
| | 540°~550° | 550°~560° | 560°~720° |
| FIRST SET OF FILTER COEFFICIENTS X | A1 | B1 | C1 |
| SECOND SET OF FILTER COEFFICIENTS Y | A2 | B2 | C2 |
| THIRD SET OF FILTER COEFFICIENTS Z | A3 | B3 | C3 |

ENGINE KNOCKING DETECTION APPARATUS WHICH ADJUSTS PASSBAND OF SENSOR SIGNAL BANDPASS FILTER IN ACCORDANCE WITH INCREASES IN CRANKSHAFT ANGLE

CROSS-REFERENCE TO RELATED APPLICATIONS

This application is based on and incorporates herein by reference Japanese Patent Application No. 2004-353144 filed on Dec. 6, 2004.

BACKGROUND OF THE INVENTION

1. Field of Application

The present invention relates to an apparatus for detecting knocking in the cylinders of an internal combustion engine.

2. Description of Related Art

FIG. 18 is a basic block diagram of an example of a known type of engine knocking detection apparatus, designated by numeral 10, which is made up of a bandpass filter 11, an amplifier 12, an A/D (analog-to-digital) converter 13 and a knocking judgement section 14, and receives a sensor signal SS from a knocking sensor 20, with the sensor signal SS varying in amplitude in accordance with vibration in an internal combustion engine (not shown in the drawings). The bandpass filter 11 selects components of the sensor signal SS that are within a frequency range that is known to correspond to the occurrence of knocking in a cylinder of the internal combustion engine, and the resultant filtered signal from the bandpass filter 11 is amplified by the amplifier 12 and then converted to digital signal form, before being supplied to the knocking judgement section 14. The knocking judgement section 14 evaluates that digital signal to determine whether or not engine knocking is occurring. Generally, this evaluation is based upon comparing the amplitude of the signal with a predetermined threshold value, and judging that knocking is occurring if the amplitude exceeds the threshold value.

When engine knocking is detected, appropriate processing is then applied to halt the knocking, e.g., by delaying the engine ignition timing.

With such a type of engine knock detection apparatus 10, it is necessary to ensure that noise components contained in the sensor signal SS (i.e., due to engine vibration that is unrelated to knocking) are removed before knocking judgement is performed on the signal. To achieve this, it is necessary for the passband of the bandpass filter 11 to accurately correspond to a frequency range that is characteristic of engine knocking. However in practice, the frequency of vibration caused by knocking will vary in accordance with the running condition of the engine. Hence, with the passband of the bandpass filter 11 being fixedly predetermined, it will not be optimum for extracting the knocking frequency components under some conditions of operation of the engine so that satisfactory knocking detection has not been achieved.

For that reason, it has been proposed (as described in Japanese patent publication No. 5-30664, referred to in the following as reference document 1) to prepare beforehand a plurality of respectively different filter characteristics for the bandpass filter of an engine knock detection apparatus. An appropriate one of these bandpass filter characteristics is selected in accordance with the speed of rotation of the engine.

With an alternative proposal (as described in Japanese patent publication No. 5-288114, referred to in the following as reference document 2), a plurality of respectively different filter characteristics for the bandpass filter are also prepared beforehand, for an engine knocking detection apparatus. In this case, the knocking frequency is analyzed in each of successive combustion stroke intervals, and the analysis results are used to select a bandpass filter characteristic that will be utilized in the next combustion stroke interval. However the actual variations that occur in the knocking frequency are complex, and for that reason, known types of knocking detection such as are described in reference documents 1 and 2 have not been completely successful.

The term "combustion stroke interval" is used herein to signify a unit amount of crankshaft angle increase that occurs between the starting points of two successive combustion strokes of an internal combustion engine.

SUMMARY OF THE INVENTION

It is an object of the present invention to overcome the above problems, by providing an engine knock detection apparatus that is capable of accurately following the variations that occur in the knocking frequency when an engine is being driven, so that reliable detection of engine knocking can be achieved.

The term "knocking frequency" is used in the following to signify, at any specific crankshaft angle during a combustion stroke interval, a frequency (within a vibration frequency range that is characteristic of occurrence of engine knocking) at which a maximum vibration amplitude occurs. Hence, the value of any specific "knocking frequency", in that sense, varies in accordance with changes in the crankshaft angle.

As described hereinafter, there may be a plurality of such vibration frequency ranges that are characteristic of knocking, at each of successive values of crankshaft angle advancement in a combustion stroke interval, so that in general there will be a plurality of knocking frequencies as defined above.

To achieve the above objectives, the invention provides an engine knocking detection apparatus which receives a sensor signal from a knocking sensor that detects vibration of an internal combustion engine, with the apparatus including bandpass filter means for filtering the sensor signal to select a knocking frequency component, and knocking judgement means that operates on the output signal from the bandpass filter means, for judging whether or not engine knocking is occurring, based on the filtered signal. The apparatus is characterized in comprising filter control means, for successively adjusting the passband of the bandpass filter means to follow changes that occur in the knocking frequency component, during each combustion stroke interval of the internal combustion engine.

Knocking is generated in a cylinder of an internal combustion engine at a resonant vibration frequency, whose value is determined by the speed of sound within the cylinder and the cylinder diameter. The speed of sound increases in proportion to the square of the absolute temperature of the medium in which the sound propagates. As the piston of an internal combustion engine moves away from its TDC position (i.e., the crankshaft angle advances from that TDC position) in a combustion stroke interval, the pressure within the cylinder decreases accordingly, so that the temperature within the cylinder gradually decreases. Hence (considering a single knocking frequency, as defined above) the value of the knocking frequency gradually decreases in accordance with crankshaft angle advancement from the TDC position. This has been confirmed experimentally by the assignees of the present invention. With the present invention, the passband of a bandpass filter which filters a sensor signal from a vibration sensor (knocking sensor) of the engine is successively adjusted to follow the changes in the knocking frequency as the crankshaft angle advances during a combustion stroke interval, so that a high level of S/N (signal-to-noise) ratio can be maintained for the output signal from the bandpass filter, throughout a wide range of variation of the crankshaft angle during the combustion stroke interval. As a result, more accurate and reliable judgement as to the occurrence of knocking can be made, based on that filter output signal.

Preferably, the filter control means successively adjusts the passband, starting from the TDC position, in accordance with increasing of the crankshaft angle from that TDC position, in each combustion stroke interval.

According to one aspect of the invention, the filter control means can be configured to adjust the passband by successively altering the center frequency of the passband. This can be achieved by either:

(a) utilizing a plurality of bandpass filters having respectively different center frequencies, with the filter control means successively selecting respective ones of the bandpass filters for providing the filtered signal to the knocking judgement means, and with the selection being performed in a sequence of decreasing values of center frequency of the bandpass filters as the crankshaft angle advances from the TDC position of a combustion stroke interval, or (b) utilizing a bandpass filter whose center frequency can be controllably varied, with the filter control means acting on the bandpass filter to successively lower its center frequency as the crankshaft angle advances from the TDC position in a combustion stroke interval.

From another aspect of the invention, when a plurality of bandpass filters having respectively different center frequencies are utilized, these filters can advantageously be configured with respectively different bandwidths. This is due to the fact that the amplitude of the bandpass filter output signal (during occurrence of knocking) gradually decreases, together with the lowering of the knocking frequency, as the crankshaft angle advances from the TDC position in a combustion stroke interval.

Hence, by configuring bandpass filters that have successively lower center frequencies and respectively corresponding bandwidths that successively decrease, and sequentially selecting these bandpass filters (to supply a filtered signal to the knocking judgement means) in order of successively decreasing values of center frequency and accordingly, successively narrower values of bandwidth, during an interval that begins from the TDC position in each combustion stroke, the S/N ratio of the bandpass filter output signal can be maintained at a satisfactory level over a wide range of crankshaft angle advancement in each combustion stroke interval.

As noted above, an internal combustion engine may exhibit a plurality of knocking frequencies. That is to say, at any specific value of crankshaft angle advancement shortly after TDC of a combustion stroke interval, there will be a plurality of frequencies of maximum vibration amplitude (local maximums), which could typically be respectively approximately 8.3 kHz, 16.5 kHz, 22.0 kHz, etc., as described in detail hereinafter. For that reason, from another aspect, the bandpass filter means of a knocking detection apparatus according to the present invention can comprise a plurality of bandpass filter sets respectively corresponding to a plurality of knocking frequencies (as defined hereinabove), each set comprising a plurality of bandpass filters having respectively different center frequencies. During each combustion stroke interval, the filter control means successively selects respective bandpass filters in each bandpass filter set, with each selected bandpass filter supplying a corresponding filtered signal to the knocking judgement means. This selection is performed in order of sequentially decreasing values of center frequency of the bandpass filters.

In that way, the center frequencies of filtering performed by the respective sets of bandpass filters can be controlled to follow the changes which occur in the corresponding knocking frequencies, as the crankshaft angle advances from TDC in a combustion stroke interval.

This enables the knocking judgement means to perform more accurate and reliable judgement of the occurrence of knocking, by comparison with that judgement being based on only a single knocking frequency. For example, the knocking judgement means can be configured to judge that knocking is occurring, if at least one of the plurality of filtered signals produced from the respective bandpass filter sets satisfies some predetermined condition that is indicative of knocking.

In the case of utilizing a bandpass filter which is controllable for adjustment of its center frequency, the filter control means controls the bandpass filter to adjust its center frequency to successively lower values, as the crankshaft angle advances from the TDC position during each combustion stroke interval. This has the advantage that the center frequency of bandpass filtering can be controlled to more closely follow the changes in knocking frequency as the crankshaft angle advances, i.e., with a higher degree of control resolution, by comparison with the use of a plurality of bandpass filters having respectively different center frequencies.

Moreover, in order to follow the changes occurring in each of a plurality of knocking frequencies as the crankshaft angle advances from TDC (as described above), it is possible to utilize a corresponding plurality of such bandpass filters each of which is controllable for adjustment of its center frequency, respectively corresponding to the plurality of knocking frequencies, with corresponding filtered signals from these bandpass filters being supplied to the knocking judgement means. In that way, the accuracy and reliability of knocking detection can be further increased.

From another aspect, in addition to successively lowering the center frequency of bandpass filtering by the bandpass filter means in accordance with crankshaft angle advancement, the invention provides a knocking detection apparatus in which the bandwidth of the bandpass filter means is also adjusted as the center frequency is changed, i.e., in which the filter control means further alters the bandwidth of the bandpass filter means in accordance with increases of the crankshaft angle from the TDC position during each combustion stroke interval.

Specifically, if the amplitude of vibration at the knocking frequency successively decreases as the crankshaft angle advances, then the knocking detection apparatus is configured such that the bandwidth of the bandpass filter means is successively narrowed accordingly. In that way, although the amplitude of the filtered signal from the bandpass filter means will successively decrease, the S/N ratio of that signal can be maintained at an appropriate level throughout the requisite range of crankshaft angle advancement in each combustion stroke interval.

From another aspect of the invention, it is possible to utilize a bandpass filter means comprising a variable bandwidth bandpass filter, whose center frequency is held fixed but whose bandwidth is successively adjusted as the crankshaft angle advances from the TDC position in each combustion stroke interval.

In that case, the bandpass filter is preferably configured to meet the following condition. Firstly, the maximum bandwidth should be determined such that the entire range of variation of the knocking frequency, during a combustion stroke interval, is contained within the passband. Secondly, the center frequency should correspond to a value of knocking frequency that occurs when the crankshaft angle has advanced by only a small amount from the TDC position in a combustion stroke interval.

From another aspect, the invention provides a knocking detection apparatus in which the knocking judgement means comprises a non-volatile memory means (e.g., ROM) in which is stored beforehand a waveform profile of the output filtered signal from the bandpass filter means, derived during actual occurrence of engine knocking, and means for reading out the stored profile and evaluating the degree of correlation between the stored waveform profile and the waveform profile of a currently derived filtered signal from the bandpass filter means, and for judging whether the knocking is currently occurring, based upon the degree of correlation.

This enables more accurate and reliable judgement of knocking occurrence to be made than is possible with the method of basing such judgement upon the amplitude of the output signal from a bandpass filter.

DESCRIPTION OF PREFERRED EMBODIMENTS

First Embodiment

Figure 2:
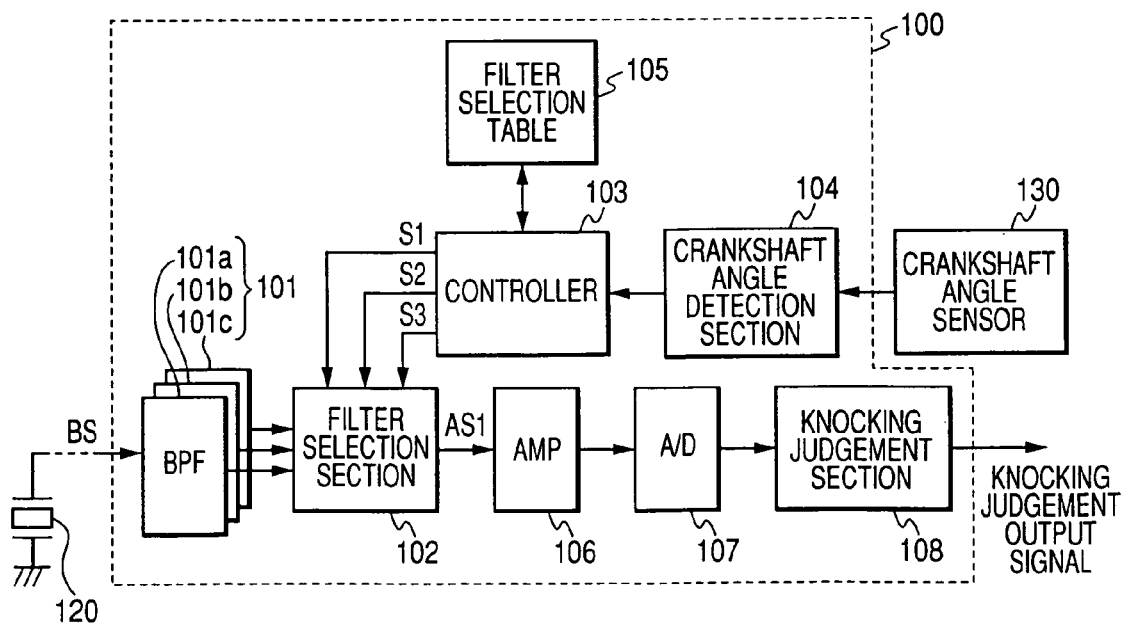
FIG. 2 is a general block diagram of a first embodiment of a knocking detection apparatus.

FIG. 2 is a general block diagram of a first embodiment of an engine knock detection apparatus. This embodiment is for use in a 4-cylinder 4-stroke internal combustion engine, so that there are four successive combustion stroke intervals in each 720° rotation angle of the engine crankshaft, as measured starting from the TDC (top dead center) position in a specific cylinder. That is, each combustion stroke interval corresponds to 180° rotation of the crankshaft, as measured from a TDC point. In the following, "amount of crankshaft rotation angle after TDC" will be abbreviated as "CA ATDC".

Figures 3, 4:
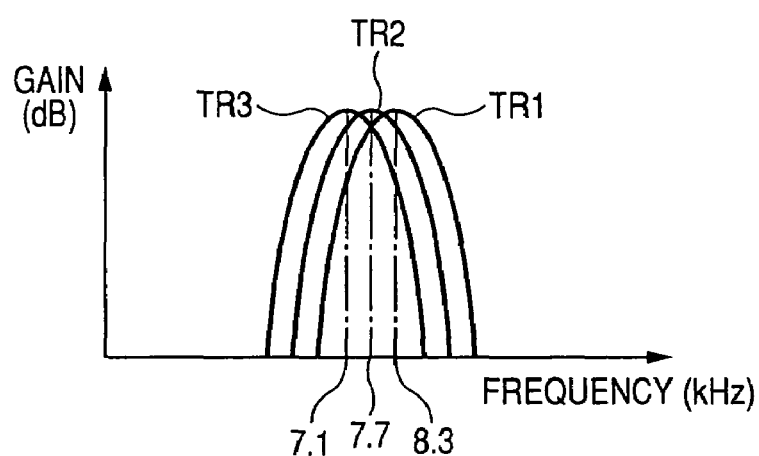
FIG. 3 is a graph showing respective passband characteristics of bandpass filters in the first embodiment.
FIG. 4 is a table showing relationships between control signals produced in the first embodiment for bandpass filter selection and corresponding ranges of crankshaft angle advancement, during each combustion stroke interval.

Thus, with one of the engine cylinders designated as the No. 1 cylinder, and the remaining three cylinders whose ignition times respectively succeed that of the No. 1 cylinder being designated as the No. 2 cylinder, the No. 3 cylinder and the No. 4 cylinder, the respective combustion stroke intervals of these cylinders in each 720° rotation of the crankshaft correspond to the following amounts of increase in crankshaft angle (with the TDC position in a combustion stroke interval of the No. 1 cylinder as reference):

No. 1 cylinder: TDC to 180° CA ATDC
No. 2 cylinder: 180° to 360° CA ATDC
No. 3 cylinder: 360° to 540° CA ATDC
No. 4 cylinder: 540° to 720° CA ATDC As shown in FIG. 2, the knocking detection apparatus 100 includes a bandpass filter set 101, a filter selector section 102, a controller 103, a crankshaft angle detection section 104, a filter selection table 105, a amplifier 106 and a A/D converter 107. The bandpass filter set 101 is made up of three bandpass filters 101a, 101b, 101c having passbands with respectively different center frequencies. The passbands are shown in FIG. 3, respectively designated as TR1, TR2, TR3, corresponding to the bandpass filters 101a, 10b, 10c, and have respective center frequencies of 8.3 kHz, 7.7 kHz and 7.1 kHz. Each of the bandpass filters 101a, 10b, 101c can for example be implemented as an active filter. A sensor signal BS produced from a knocking sensor 120 is supplied to the bandpass filter set 101, to be filtered by each of the bandpass filters 101a, 101b, 101c.

Figure 1:
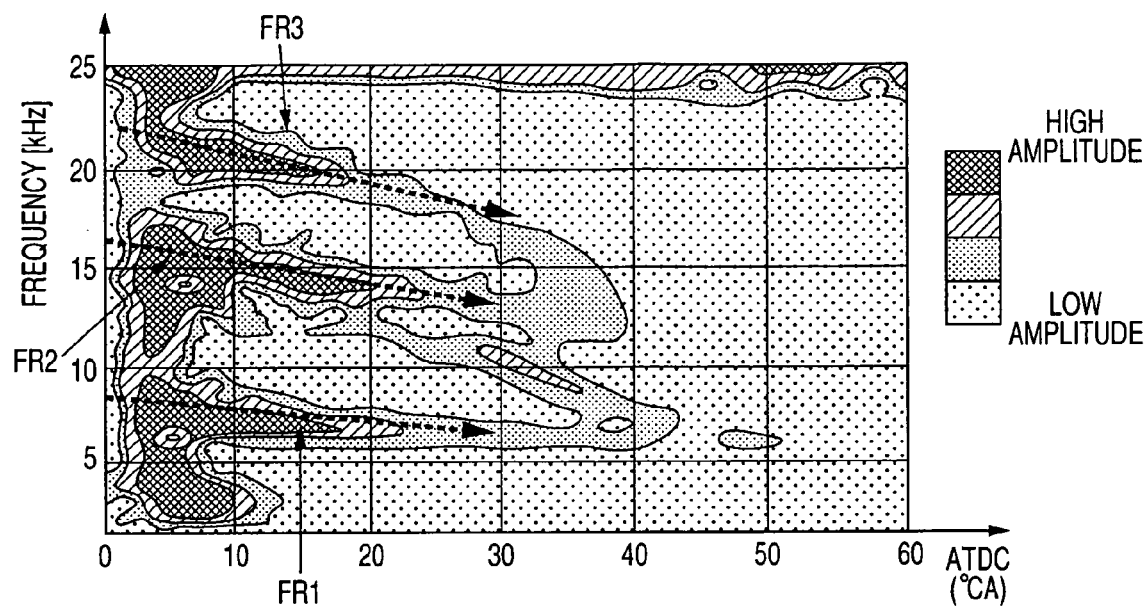
FIG. 1 is a diagram illustrating the relationship between amplitude of vibration and vibration frequency within a specific range of crankshaft angle advancement in a combustion stroke interval of an internal combustion engine, during occurrence of knocking.

FIG. 1 is a distribution diagram, showing an example of the amplitude distribution of vibration of a 4-cylinder 4-stroke internal combustion engine, when knocking occurs, during a period extending from a TDC position of the crankshaft in a combustion stroke interval until the crankshaft has rotated through 60° from that TDC position, with that amount of crankshaft rotation being referred to as "ATDC 60° CA". In FIG. 1, values of vibration frequency are plotted along the vertical axis and values of crankshaft rotation angle along the horizontal axis, with different amplitudes of vibration being indicated by cross-hatching, etc., of specific regions as shown.

As described above, it is necessary to substantially remove the noise components in the sensor signal that is supplied from an engine knocking sensor by bandpass filtering, to achieve reliable detection of engine knocking. However in practice, for the reasons described hereinabove, the knocking frequency becomes successively lower as the crankshaft angle advances from the TDC position of a combustion stroke interval.

More specifically, as shown in FIG. 1, at any particular value of crankshaft angle after TDC, the engine vibration during knocking has various frequency components having various amplitudes. In the example of FIG. 1, FR1, FR2, FR3 indicate respective knocking frequencies as defined hereinabove, i.e., at which (local) maximum vibration amplitudes occur (within respective frequency ranges that are characteristic of knocking) during engine knocking. It will be assumed that immediately after the start of a combustion stroke interval in which there is knocking, the respective knocking frequency values are approximately 8.3 kHz for FR1, 16.5 kHz for FR2 and 22.0 kHz for FR3. As the crankshaft angle advances after TDC of that combustion stroke interval, these knocking frequencies become successively lower, as indicated by the dotted-line arrows in FIG. 1.

With the first embodiment, the center frequency of bandpass filtering is successively lowered as the crankshaft angle increases after TDC, to follow the lowering of a specific one of the knocking frequencies, specifically, FR1. That is to say, the center frequency of the bandpass filtering is maintained at approximately the knocking frequency FR1, as the crankshaft angle advances. In that way, an increased S/N ratio can be attained for the filter output signal used in judging whether knocking is occurring, by comparison with a method in which the bandpass filter center frequency is held fixed, so that more reliable judgement of knocking occurrence can be achieved.

The output signals from the bandpass filters 101a, 101b, 101c are supplied to the filter selector section 102, which is controlled by control signals S1, S2, S3 produced from the controller 103, for selecting one of these filter output signals, to be supplied to the amplifier 106 as the filtered signal AS1. When the control signal S1 is being outputted from the controller 103, the output signal from the bandpass filter 101a is selected, while similarly the control signals S2, S3 respectively select the bandpass filters 101b and 101c.

A crankshaft angle sensor 130 produces a sensor signal in accordance with rotation of the engine crankshaft, and supplies that signal to the crankshaft angle detection section 104, which thereby produces a crankshaft angle detection signal indicative of the current angular position of the crankshaft, and supplies that signal to the controller 103.

The controller 103 utilizes the detected value of crankshaft angle to look up a filter selection table, which contains data expressing correspondences between the control signals S1, S2, S3 and respective ranges of angular positions of the crankshaft within two rotations (720°). The controller 103 thereby produces one of the control signals S1, S2, S3 in accordance with the current angular position of the crankshaft. That angular position is measured from the ignition TDC position for a specific cylinder (the No. 1 cylinder) of the engine, as the 0° angle. Thus for example the control signal S1 is produced when the crankshaft angle is within the range 0° to 10° (during a combustion stroke interval of the No. 1 cylinder), when the crankshaft angle is within the range 180° to 190° (during a combustion stroke interval of No. 2 cylinder), when the crankshaft angle is within the range 360° to 370° (during a combustion stroke interval of the No. 3 cylinder), and when the crankshaft angle is within the range 540° to 550° (during a combustion stroke interval of the No. 4 cylinder).

In that way, the controller 103 performs successive stepwise changeovers of the center frequency of bandpass filtering by sequentially outputting the control signals S1, S2, S3 at appropriate timings in each combustion stroke interval, as the crankshaft angle increases from the TDC position, for each of the four cylinders in sequence. The bandpass filter center frequency is thereby appropriately adjusted to follow the changes in the knocking frequency that occur as the crankshaft angle increases after TDC in each combustion stroke interval.

The amplifier 106 amplifies the selected filtered output signal AS1 produced from the filter selector section 102, and the resultant amplified signal is converted to a digital signal by the A/D converter 107. The knocking judgement section 108 evaluates that digitized signal AS1, to judge whether engine knocking is occurring.

As shown in FIG. 1, the vibration caused by engine knocking is substantially concentrated within the crankshaft range from TDC to 60° CA ATDC in each combustion stroke interval. For that reason, with this embodiment, the profile evaluation is performed by the knocking judgement section 108 using data acquired within that range of TDC to 60° CA ATDC in each combustion stroke interval. The knocking judgement section 108 then (during the interval that elapses from 60° CA to 180° CA ATDC, in that combustion stroke interval) completes the processing to judge whether knocking is occurring and outputs a signal indicative of the judgement result to an external apparatus such as an engine controller (not shown in the drawings).

It would be possible for the knocking judgement section 108 to be configured to perform that judgement based upon whether the amplitude of the signal AS1 exceeds a predetermined threshold value, as described hereinabove. However with the embodiment, a preferred method of judgement is utilized, in order to obtain the full effects of increased S/N ratio that is achieved for the filtered signal AS1. Specifically, data are derived beforehand that express the waveform profile of the filtered signal AS1 while engine knocking is actually occurring, and the stored profile is subsequently compared with the profile of the filtered signal AS1 during operation of the engine, acquired in each combustion stroke interval.

Here, the term "waveform profile" is used to signify a set of values that express (accurately, or to some degree of approximation) the successive variations in amplitude of a vibration signal that occur within a specific interval. The profile can simply consist of the absolute values of successive samples (i.e., digital values) of the signal during the interval, or can be obtained by processing such as filtering the successive absolute sample values in some manner, performing interpolation between periodically selected samples, etc.

With this embodiment the waveform profile of the bandpass filter output signal AS1 that is acquired beforehand during occurrence of engine knocking is stored in a non-volatile memory (i.e., ROM) in the knocking judgement section 108. The stored profile values are acquired during an amount of crankshaft rotation from TDC to 60° ATDC in a combustion stroke interval. Thereafter during operation of the knocking detection apparatus 100, in each combustion stroke interval of the respective cylinders, the knocking judgement section 108 derives the waveform profile of the filtered signal AS1 during the first 60° of crankshaft rotation after TDC, and obtains a value (i.e., correlation coefficient) expressing the degree of correlation between that currently derived profile and the waveform profile stored in memory beforehand. If the degree of correlation is above a predetermined level, then the knocking judgement section 108 judges that engine knocking is occurring. Processing can then be performed (e.g., by an engine control unit) o halt the occurrence of knocking.

Since various methods are known for deriving a correlation coefficient whose magnitude expresses the degree of correlation between two numeric sequences, detailed description of the correlation evaluation processing is omitted.

Figure 17:
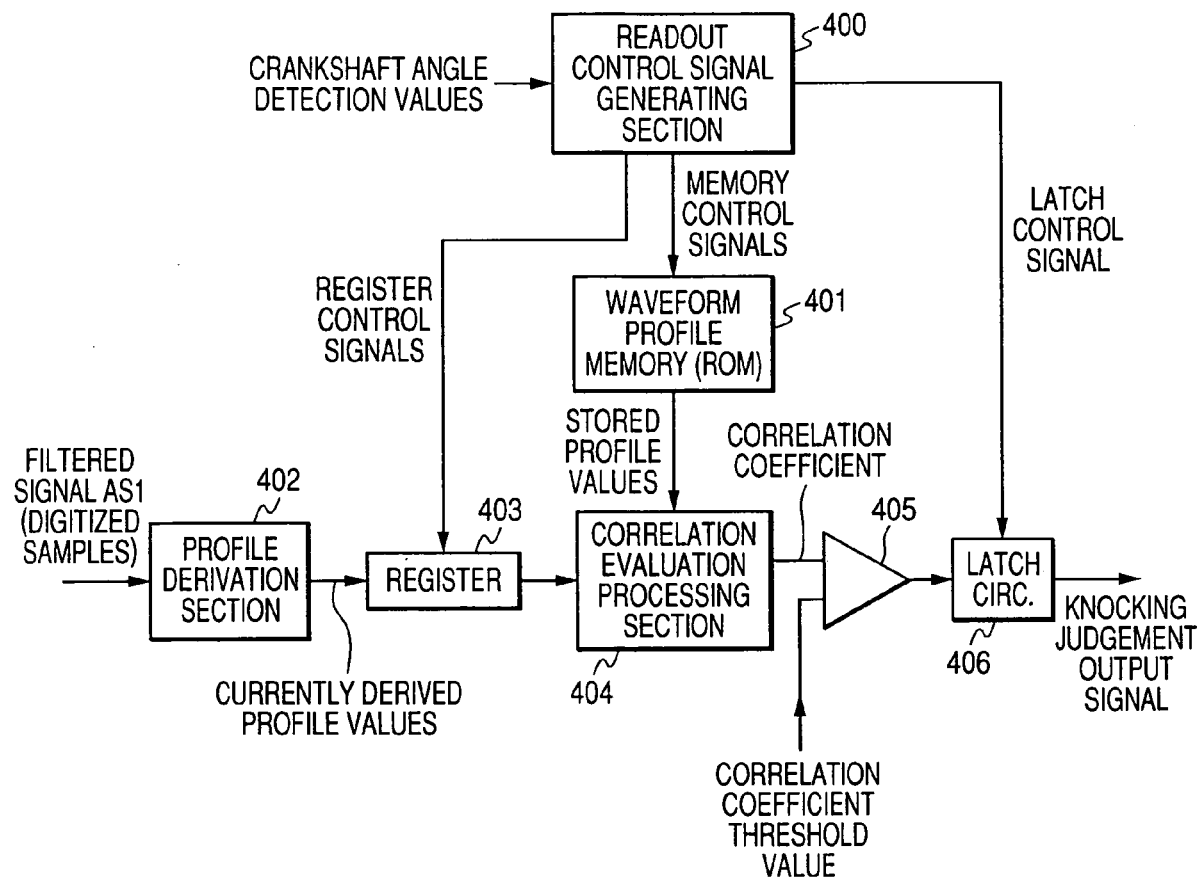
FIG. 17 is a general block diagram showing an example of the configuration of a knocking judgement section in the first embodiment; and, FIG. 18 is a general block diagram of an example of a prior art type of knocking detection apparatus.
Figure 18:
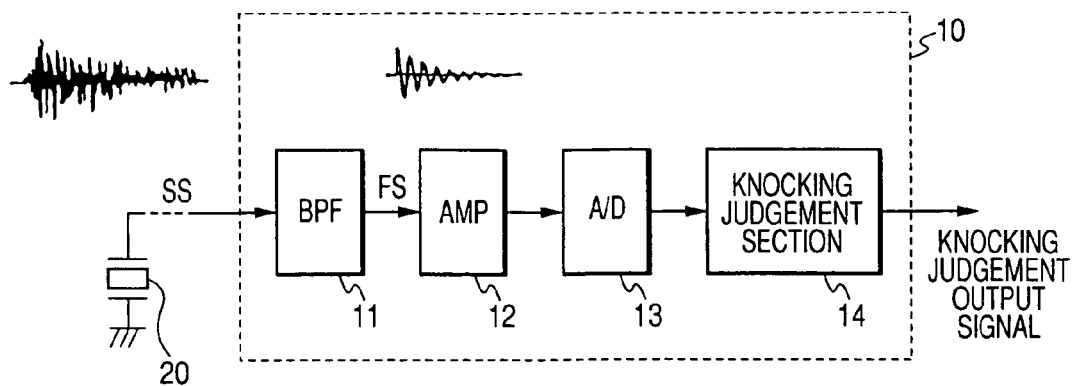

FIG. 17 is a block diagram for describing the internal configuration of the knocking judgement section 108 of this embodiment, made up of a readout control signal generating section 400, a waveform profile memory 401, profile derivation section 402, a register 403, a correlation evaluation processing section 404, a comparator 405 and a latch circuit 406. The profile derivation section 402 derives successive values of a waveform profile of the (digitized) filtered signal AS1 supplied from the A/D converter 107, while the waveform profile memory 401 has stored therein a set of values constituting a waveform profile of the signal AS1 acquired in the first 60° of crankshaft rotation from TDC during occurrence of knocking, as described above. The readout control signal generating section 400 generates control signals for controlling write-in and readout of currently derived profile values (generated by the profile derivation section 402) to/from the register 403 and for clearing the register 403. The readout control signal generating section 400 also generates control signals for controlling readout of stored profile values from the waveform profile memory 401. The timings of these control signals are determined by the readout control signal generating section 400 based on based on crankshaft angle detection values that are produced by the crankshaft angle detection section 104 as described above.

With this circuit, at the start (TDC position) of each combustion stroke interval, the readout control signal generating section 400 applies a control signal to enable write-in of successive profile values of the filtered signal AS1 to the register 403. When the crankshaft angle has reached 60° after TDC, the readout control signal generating section 400 halts write-in to the register 403, and applies control whereby successive ones of the stored profile values in the waveform profile memory 401 and of the profile values held in the register 403 are supplied to the correlation evaluation processing section 404. During a part of the succeeding advancement of the crankshaft angle from 60° to 180° ATDC, the correlation evaluation processing section 404 calculates the degree of correlation between the respective sets of profile values read in from the register 403 and the waveform profile memory 401, as a correlation coefficient value. That value is then compared with a predetermined correlation coefficient threshold value in the comparator 405, which produces a binary output signal at a level that is in accordance with whether or not the calculated correlation coefficient is above the threshold value.

That output signal level is then registered by the latch circuit 406, which thereby produces an output signal (knocking judgement output signal) whose level indicates whether or not knocking is detected.

The readout control signal generating section 400 then clears the register 403, in preparation for repeating the above series of operations in the next combustion stroke interval.

Although the various functions executed in the knocking judgement section 108 have described above based on interconnected blocks, for ease of understanding, it will be understood that these can readily be implemented in software form, i.e., as a subroutine of a main control program which also implements the functions of the controller 103 in FIG. 1.

Basing the knocking judgement function upon the correlation between waveform profiles as described above provides a substantial increase in accuracy and reliability of knocking detection, by comparison with a method which is based on comparing the amplitude of a knocking sensor signal with a predetermined threshold value.

Figure 5:
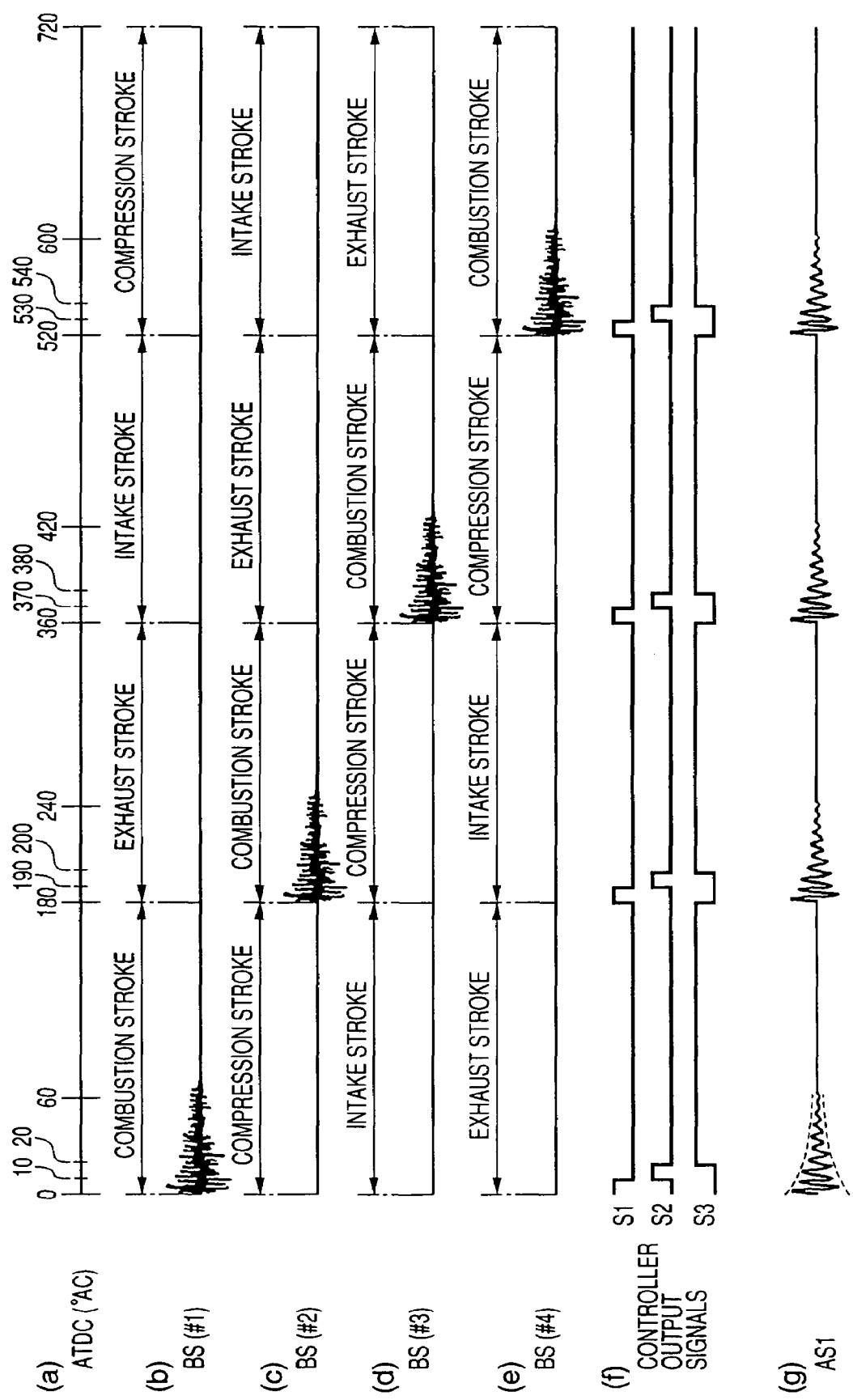
FIGS. 5(a) to 5(g) are timing diagrams for use in describing the operation of the first embodiment.

FIG. 5 is a timing diagram for the first embodiment, illustrating respective waveforms of the vibration that occurs due to knocking, in four successive combustion stroke intervals of the engine, as the crankshaft angle increases from TDC to 720° ATDC of the No. 1 cylinder. FIG. 5(a) shows the successive amounts of crankshaft angle increase, while FIG. 5(b) shows the waveform of the sensor signal BS from the knocking sensor 120 in a combustion stroke interval of the No. 1 cylinder, and FIGS. 5(c), (d) and (e) show corresponding waveforms of the sensor signal BS in successive combustion stroke intervals of the No. 2, No. 3 and No. 4 cylinders respectively.

Assuming that combustion in the combustion chamber of the No. 1 cylinder begins when the corresponding piston reaches TDC, the vibration due to knocking in that cylinder begins at that point.

FIG. 5(f) shows the waveforms of the control signals S1, S2, S3 that are outputted from the controller 103. As shown, in each combustion stroke interval, the control signal S1 is produced (i.e., goes to an active level) while the crankshaft angle is in the range from TDC to 10° ATDC, so that the bandpass filter 101a is selected during that interval. Similarly, the control signal S2 is produced while the crankshaft angle is in the range from 10° to 20° ATDC, so that the bandpass filter 101b is selected during that interval, and the control signal S3 is produced while the crankshaft angle is in the range from 20° to 180° ATDC, so that the bandpass filter 101c is selected during that interval.

In that way, as the crankshaft angle successively increases after TDC in a combustion stroke interval, the bandpass filters 101a, 101b, 101c of the bandpass filter set 101 are sequentially selected, i.e., filters whose respective center frequencies successively decrease. The center frequency of the bandpass filtering thus is successively altered in a stepwise manner, to follow the changes that occur in the knocking frequency FR1 shown in FIG. 1.

An improved S/N ratio and high amplitude is thereby obtained for the filter output signal AS1, whose waveform is illustrated in FIG. 5(g).

During each combustion stroke interval of the No. 1 cylinder, the No. 2, No. 3 and No. 4 cylinders are respectively undergoing a compression stroke, an air intake stroke, and an exhaust stroke. When the crankshaft angle reaches 180° ATDC of the No. 1 cylinder, an exhaust stroke of that cylinder begins, while a combustion stroke of the No. 2 cylinder begins, and (if knocking is occurring) the sensor BS containing the knocking frequency components resulting from combustion in the No. 2 cylinder begins to be supplied to the bandpass filter set 101, and successively filtered by the bandpass filters 101a, 101b, 10c. The same process is successively repeated for the No. 3 and No. 4 cylinders, then at the end of the combustion stroke of the No. 4 cylinder, a combustion stroke of the No. 1 cylinder again begins.

In that way, the knocking detection apparatus 100 successively acquires and processes knocking sensor signal information for each of the engine cylinders, in respective combustion stroke intervals, which occur during crankshaft angle rotation ranges of 0° to 180°, 180° to 360°, 360° to 520°, and 520° to 720° ATDC of the No. 1 cylinder.

The following effects are obtained with this embodiment:

(1) The bandpass filter set 101 is formed of a plurality of bandpass filters (101a to 10c) having respectively different values of center frequency. During a combustion stroke interval of the engine, as the crankshaft angle increases from the TDC position, bandpass filters having respectively lower values of center frequency are sequentially selected, to filter a sensor signal that may contain knocking frequency components. As a result, a substantially improved S/N ratio can be obtained for the filtered sensor signal (AS1), enabling increased reliability and accuracy of detecting engine knocking.

(2) A waveform profile of the filter output signal from the bandpass filter set 101 that appears during a combustion stroke interval, when engine knocking occurs, is stored beforehand in a non-volatile memory such as a ROM. During engine operation, in each combustion stroke interval, that stored profile is read out and compared with the profile of the actual bandpass filter output signal that is obtained during that combustion stroke interval (more specifically, during a predetermined initial part of that combustion stroke interval, following TDC). Judgement as to whether engine knocking is occurring is made based on the degree of correlation between the stored profile and the currently obtained profile. As a result, improved reliability and accuracy of detecting engine knocking can be achieved, by comparison with previous methods which are based only on the amplitude of the filter output signal.

Second Embodiment

A second embodiment will be described in the following, which also is an engine knocking detection apparatus applicable to a 4-cylinder internal combustion engine, as for the first embodiment. Whereas the first embodiment performs bandpass filtering by selecting one of a plurality of bandpass filters having respectively different center frequencies, with the second embodiment a (single) variable center frequency type of bandpass filter is utilized, whose passband characteristic is adjusted by altering the center frequency of the passband, by a control signal.

Figure 6:
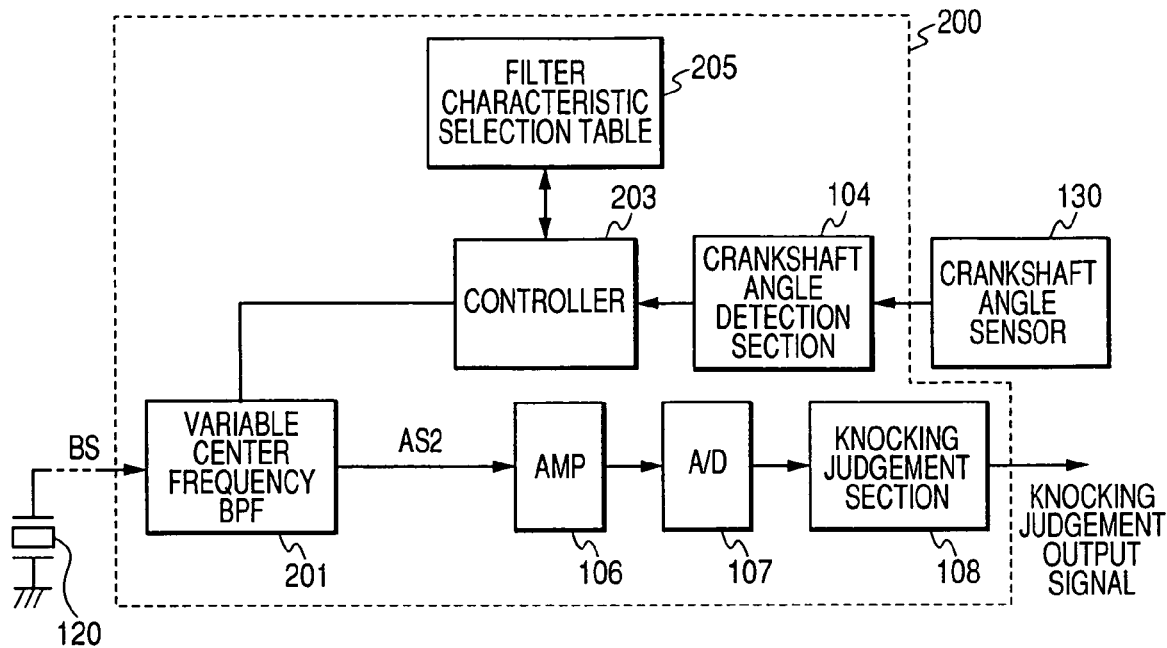
FIG. 6 is a general block diagram of a second embodiment of a knocking detection apparatus.

FIG. 6 is a general block diagram of the engine knocking detection apparatus 200 of this embodiment, which differs from that of FIG. 1 in that a variable center frequency bandpass filter 201 replaces the bandpass filter set 101, and in that a controller 203 generates an appropriate control signal for controlling the passband characteristic of the variable bandpass filter 201, while in addition a filter characteristic selection table 205 holds filter characteristic variation values, used as described hereinafter.

Figure 7:
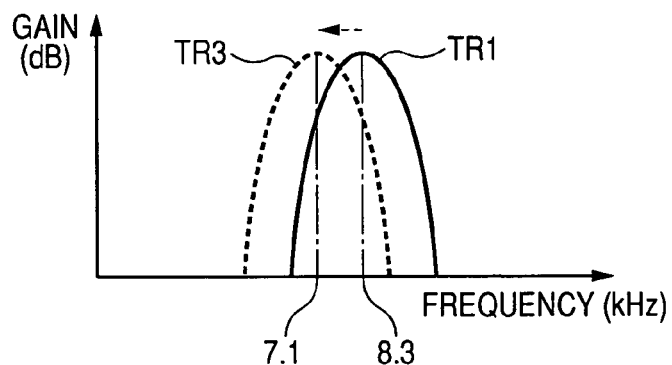
FIG. 7 is a graph showing variation of the passband characteristic of a bandpass filter in the second embodiment.

Variation of the passband characteristic of the variable bandpass filter 201 is illustrated in the graph of FIG. 7. As shown, this can be successively altered from a characteristic TR1 having center frequency of 8.3 kHz to a characteristic TR3, having a center frequency of 7.1 kHz.

Figure 8:
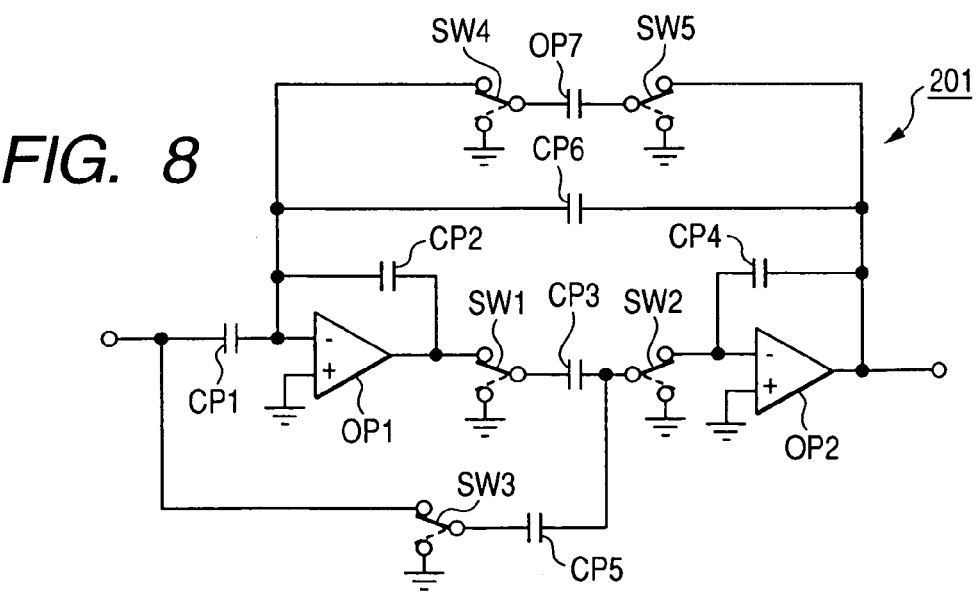
FIG. 8 is a circuit diagram of a switched capacitor filter utilized as a bandpass filter in the second embodiment.

An example of the circuit of the variable bandpass filter 201 is shown in FIG. 8. This is made up of two operational amplifiers OP1, OP2, seven capacitors CP1 to CP7, and five switches SW1 to SW5, interconnected as shown. Each of the switches SW1 to SW5 is controlled by a control signal produced by the controller 203. The circuit of FIG. 8 is a known type of switched capacitor bandpass filter, whose center frequency can be changed by altering the switching frequency of the switches SW1 to SW5, with that switching frequency being determined by the control signal supplied from the controller 203.

In the same way as for the controller 103 of the first embodiment, the controller 203 acquires the crankshaft angle of the engine from the crankshaft angle detection section 104, and obtains a value from the filter characteristic selection table 205 in accordance with the crankshaft angle. The values stored in the filter characteristic selection table 205 represent respective values of switching frequency to be established for the variable bandpass filter 201, to achieve corresponding center frequencies for the bandpass filter, that will be appropriate for the various values of crankshaft angle during each combustion stroke interval.

The controller 203 thereby controls the passband characteristic of the variable bandpass filter 201 to be appropriate for the current crankshaft angle during each combustion stroke interval, with the center frequency of bandpass filtering being successively shifted to lower values as the crankshaft angle advances from the TDC position.

A specific configuration for the controller 203 to achieve this form of control can be readily envisaged, for example as described in reference document 2, so that detailed description is omitted.

Figure 9:
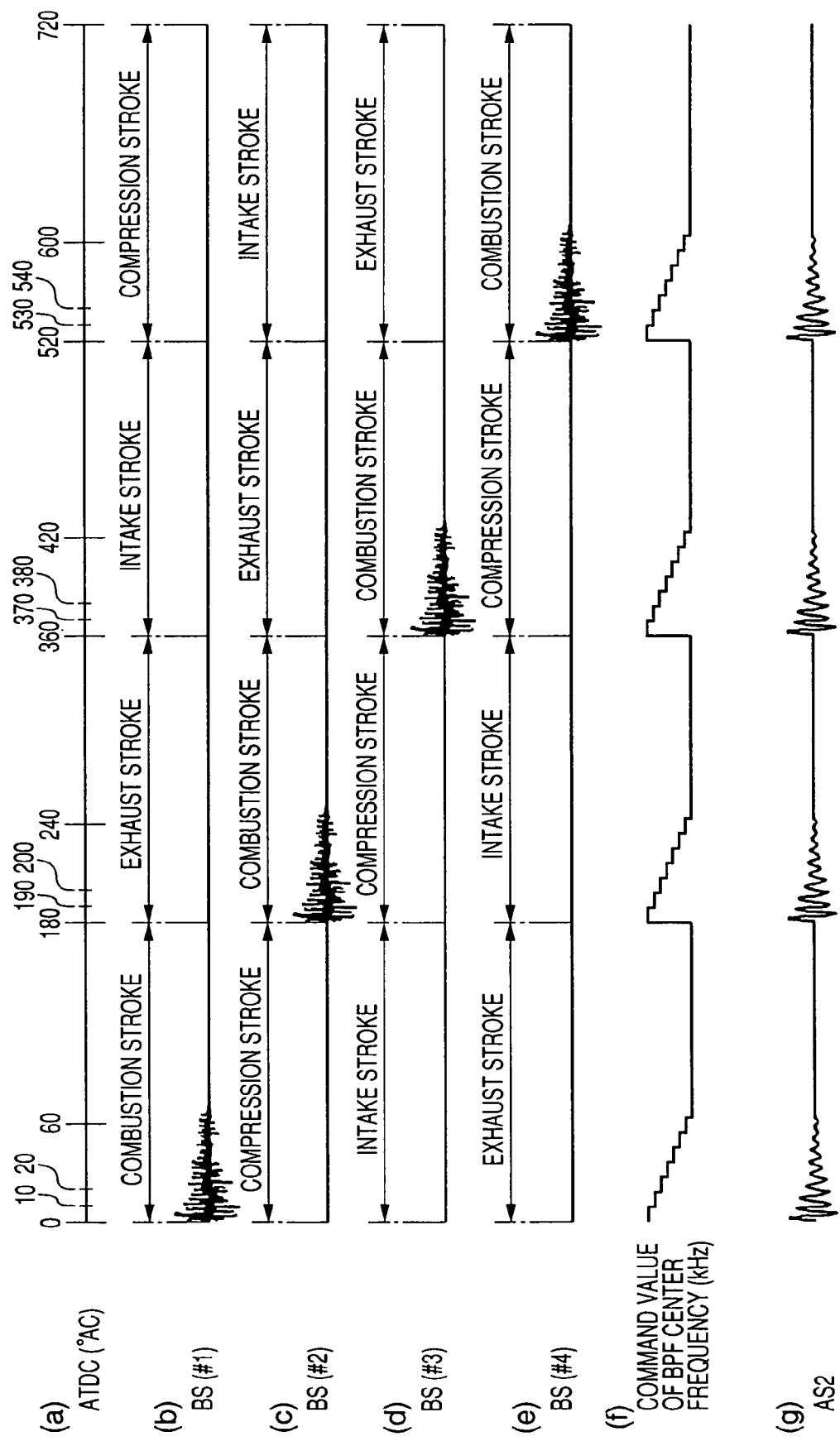
FIGS. 9(a) to 9(g) are timing diagrams for use in describing the operation of the second embodiment.

FIG. 9 is a timing diagram for the second embodiment, illustrating respective waveforms of the vibration that occurs due to knocking, in four successive combustion stroke intervals of the engine, as the crankshaft angle increases from TDC to 720° ATDC of the No. 1 cylinder. The diagrams of FIG. 9($a$), 9($b$), 9($c$), 9($d$) and 9($e$) respectively correspond to the diagrams of FIG. 5($a$), 5($b$), 5($c$), 5($d$) and 5($e$) of the first embodiment described above, so that further description of these is omitted.

FIG. 9($f$) graphically illustrates the command values of center frequency of the bandpass filter 201 that are specified by the control signal that is applied from the controller 203 to control the switching frequencies of the switching elements SW1 to SW5. During each interval from TDC to 60° CA ATDC in each combustion stroke interval, the center frequency is successively lowered as shown, from 8.3 kHz to 7.1 kHz as illustrated by the broken-line arrow in FIG. 7, to follows the changes that occur in the knocking frequency FR1 shown in FIG. 1 as the crankshaft angle increases from TDC to 60° CA ATDC in each combustion stroke interval.

As a result, as illustrated in FIG. 9($g$), a filter output signal AS2 is obtained from the variable bandpass filter 201, having an S/N ratio that is substantially improved by comparison with prior art methods.

Since this embodiment uses a switched capacitor filter as the bandpass filter 201, the control signal from the controller 203 can be applied to control the variation of the filter center frequency with a higher resolution than can be achieved with the first embodiment, so that for example the center frequency of the variable bandpass filter 201 can be controlled to vary linearly within the required range of crankshaft angle advancement. Hence the center frequency of the variable bandpass filter 201 can be controlled to follow the changes in the knocking frequency FR1 more accurately than is possible with the first embodiment.

This control is applied identically during each of respective combustion stroke intervals of the No. 1, No. 2, No. 3 and No. 4 cylinders of the engine, to derive the filter output signal AS1 in each of these combustion stroke intervals.

It can thus be understood that this embodiment provides the advantageous effect (2) described above for the first embodiment, while also providing the following additional effect:

(3) With the second embodiment, bandpass filtering is performed by using a bandpass filter (201) whose center frequency can be varied continuously, and so can be controlled to successively shift the center frequency to lower values in a substantially continuous manner, in accordance with increases in the crankshaft angle following a TDC position of a combustion stroke interval.

Third Embodiment

A third embodiment will be described in the following, which is an engine knocking detection apparatus that is applicable to a 4-cylinder internal combustion engine, as for the preceding embodiments. With the third embodiment, three bandpass filters are utilized which respectively correspond to the knocking frequencies FR1, FR2, FR3 shown in FIG. 1 and described above. The respective center frequencies of these bandpass filters are shifted successively downward, during the first part of each combustion stroke interval, in accordance with changes in these knocking frequencies, as the crankshaft angle advances.

Figure 10:
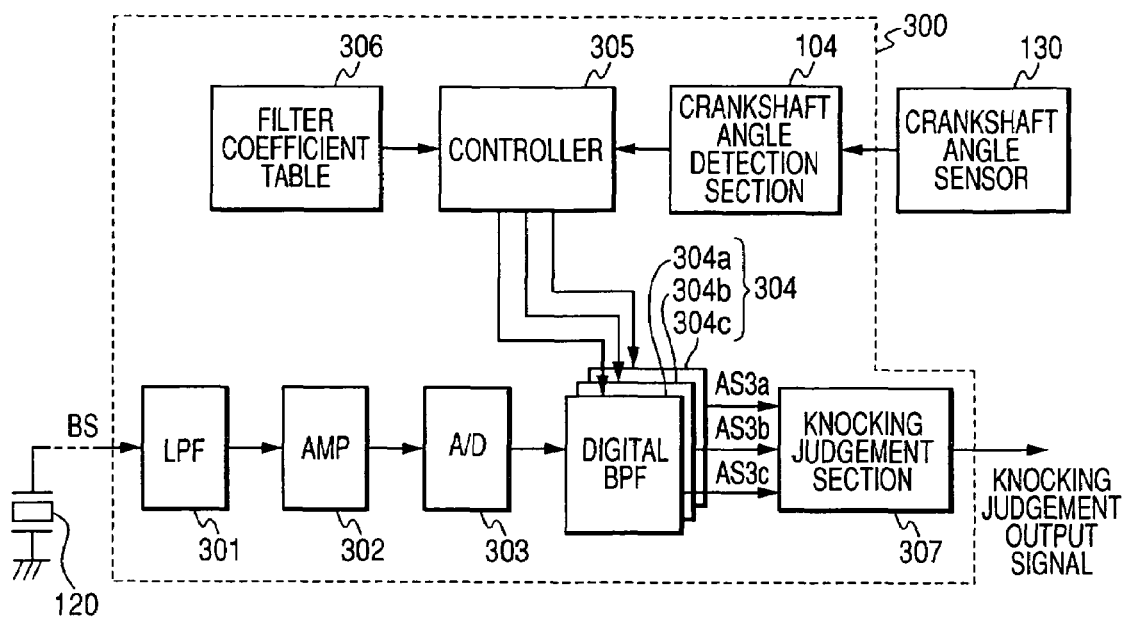
FIG. 10 is a general block diagram of a third embodiment of a knocking detection apparatus.

FIG. 10 is a general block diagram of the engine knocking detection apparatus 300 of the third embodiment, in which the sensor signal BS from the knocking sensor 120 is first transferred through a low-pass filter 301. The low-pass filter 301 serves as an anti-aliasing filter, removing certain high-frequency components of the sensor signal BS, for the purposes of subsequent A/D conversion. The output filtered signal from the low-pass filter 301 is amplified in an amplifier 302, and the resultant amplified filtered signal is supplied to an A/D converter 303. The resultant digitized filtered signal produced from the A/D converter 303 is supplied to a digital bandpass filter set 304.

Figure 11A:
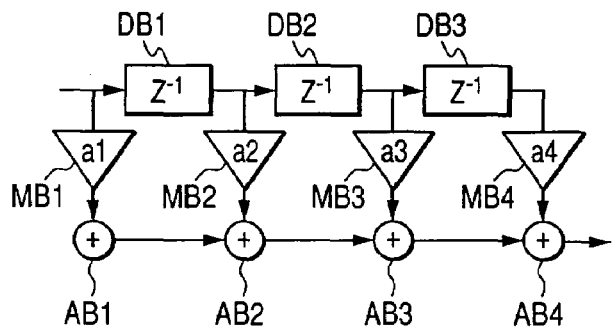
FIGS. 11A and 11B are respective circuit diagrams of two examples of a digital filter which could be utilized as a bandpass filter in the third embodiment.
Figure 11B:
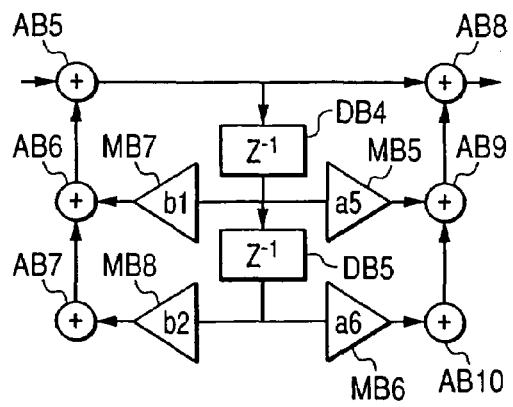

The digital bandpass filter set 304 is made up of three digital bandpass filters 304a, 304b, 304c, each being a variable center frequency type of bandpass filter. Each of these filters can for example be configured as a FIR (Finite Impulse Response) filter as shown in FIG. 11A, being made up of three delay elements DB1 to DB3, four factor multipliers MB1 to MB4, and four adders AB1 to AB4. Alternatively, each of the filters can for example be configured as an IIR (Infinite Impulse Response) filter as shown in FIG. 11B, being made up of two delay elements DB4, DB5, four factor multipliers MB5 to MB6, and six adders AB5 to AB10. However various other configurations are also possible.

If either of the configurations of FIGS. 11A or 11B is used to configure each of the digital bandpass filters 304a, 304b, 304c, the center frequency of each filter is varied by altering the values of the multiplication factors of the factor multipliers (i.e., a1 to a4 in the case of FIG. 11A, a5, a6 and b1, b2 in the case of FIG. 11B).

Figures 12, 13:
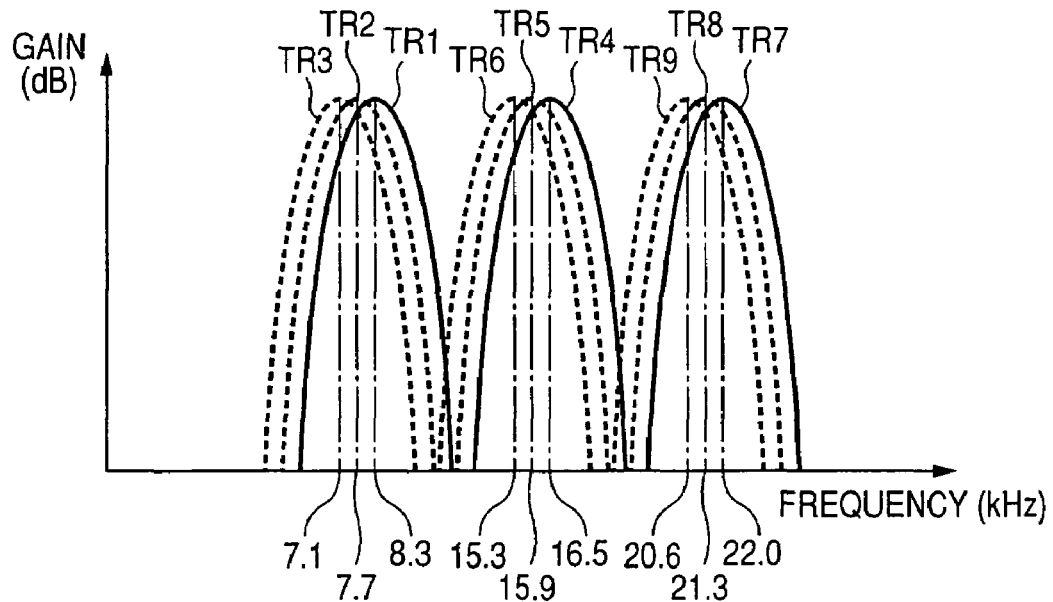
FIG. 12 is a graph illustrating variation of respective passband characteristics of a plurality of bandpass filters of the third embodiment.
FIG. 13 is a diagram illustrating the contents of a filter coefficient table of the third embodiment.

The center frequencies of the three digital bandpass filters 304a, 304b, 304c respectively correspond to the knocking frequencies FR1, FR2, FR3 shown in FIG. 1. Specifically, the center frequencies the digital bandpass filters 301a, 301b, 301c can be respectively adjusted downward from initial (basic) values of 8.3 kHz, 16.6 kHz and 22.0 kHz, by altering the multiplication factors of the factor multipliers of each filter as described above. This is illustrated in FIG. 12, in which the passband characteristics corresponding to the center frequencies of 8.3 kHz, 16.6 kHz and 22.0 kHz of the digital bandpass filters 304a, 304b, 304c are respectively designated as TR1, TR4 and TR8. The center frequency of each bandpass filter is successively shifted downward from its initial value during an initial portion of each combustion stroke interval, in accordance with increases in the crankshaft angle, as described for the preceding embodiments.

The controller 305 refers to the filter coefficient selection table 306 to obtain respective sets of filter coefficients that are to be set into the bandpass filters 304a, 304b, 304c, in accordance with crankshaft angle values supplied to the controller 305 from the crankshaft angle detection section 104. FIG. 13 is an example of the contents of the filter coefficient selection table 306, in which sets of filter coefficients for the bandpass filters 304a, 304b, 304c are respectively designated as the first filter coefficient set X, the second filter coefficient set Y, and the third filter coefficient set Y. If each of the bandpass filters 304a, 304b, 304c is configured as shown in FIG. 11A, then when the crankshaft angle enters the range TDC to 10° ATDC in a combustion stroke interval of the No. 1 cylinder, the controller 305 reads out from the filter coefficient selection table 306 (as part of the first filter coefficient set X) respective filter coefficients that are to be set for the bandpass filter 304a, i.e., appropriate values for the multiplier factors a1 to a4 of the set of factor multipliers MB1, MB2, MB3, MB4 of that filter, designated collectively as A1 in FIG. 13. In addition, at this time, the controller 305 reads out from the filter coefficient selection table 306 (as part of the second filter coefficient set Y) respective filter coefficients for the bandpass filter 304b, with these filter coefficients designated as A2 in FIG. 13, and (as part of the third filter coefficient set Z) respective filter coefficients for the bandpass filter 304c, with these filter coefficients designated as A3 in FIG. 13.

The sets of filter coefficients A1, A2, A3 are thereby respectively set in the bandpass filters 304a, 304b, 304c during the first 10° of crankshaft rotation ATDC in a combustion stroke interval of the No. 1 cylinder.

As a result, during that interval, the center frequency of the bandpass filter 304a is set as 8.3 kHz (corresponding to the passband TR1 in FIG. 12), while the center frequency of the bandpass filter 304b is set as 16.5 kHz (corresponding to the passband TR4), and the center frequency of the bandpass filter 304c is set as 22.0 kHz (corresponding to the passband TR7).

Thus in this condition the center frequencies of the bandpass filters 304a, 304b, 304c correspond approximately to the respective values of the knocking frequencies FR1, FR2, FR3 that occur, during engine knocking, when the crankshaft angle is increasing from TDC to 10° ATDC in a combustion stroke interval of the No. 1 cylinder.

Next, when the crankshaft angle enters the range 10° to 20° ATDC, the controller 305 reads out from the filter coefficient selection table 306 (as part of the first filter coefficient set X) the filter coefficients designated as B1 in FIG. 13, and supplies these to be set into the bandpass filter 304a.

At the same time, the controller 305 reads out from the filter coefficient selection table 306 (as part of the second filter coefficient set Y) the filter coefficients designated as B2 in FIG. 13, and supplies these to be set into the bandpass filter 304b, and also reads out from the filter coefficient selection table 306 (as part of the third filter coefficient set Y) the filter coefficients designated as B3 in FIG. 13, and supplies these to be set into the bandpass filter 304c.

The sets of filter coefficients B1, B2, B3 are thereby respectively set in the bandpass filters 304a, 304b, 304c during the second 100 of crankshaft rotation ATDC in a combustion stroke interval of the No. 1 cylinder.

As a result, during that interval, the center frequency of the bandpass filter 304a is set as 7.7 kHz (corresponding to the passband TR2 in FIG. 12), while the center frequency of the bandpass filter 304b is set as 15.9 kHz (corresponding to the passband TR5), and the center frequency of the bandpass filter 304c is set as 21.3 kHz (corresponding to the passband TR8).

Thus in this condition the center frequencies of the bandpass filters 304a, 304b, 304c correspond approximately to the values of the knocking frequencies FR1, FR2, FR3 respectively, that occur when the crankshaft angle is increasing from 10° to 20° ATDC in a combustion stroke interval of the No. 1 cylinder.

Next, when the crankshaft angle enters the range 20° to 180° ATDC, the controller 305 reads out from the filter coefficient selection table 306 (as part of the first filter coefficient set X) the filter coefficients C1, and supplies these to be set into the bandpass filter 304a. At the same time, the controller 305 reads out from the filter coefficient selection table 306 (as part of the second filter coefficient set Y) the filter coefficients C2, and supplies these to be set into the bandpass filter 304b, and also reads out from the filter coefficient selection table 306 (as part of the third filter coefficient set Y) the filter coefficients C3, and supplies these to be set into the bandpass filter 304c.

The sets of filter coefficients C1, C2, C3 are thereby respectively set in the bandpass filters 304a, 304b, 304c during the final 160° of crankshaft rotation after TDC in a combustion stroke interval of the No. 1 cylinder.

As a result, during that interval, the center frequency of the bandpass filter 304a is set as 7.1 kHz (corresponding to the passband TR3 in FIG. 12), while the center frequency of the bandpass filter 304b is set as 15.3 kHz (corresponding to the passband TR6), and the center frequency of the bandpass filter 304c is set as 20.6 kHz (corresponding to the passband TR9).

Thus in this condition the center frequencies of the bandpass filters 304a, 304b, 304c correspond approximately to the values of the knocking frequencies FR1, FR2, FR3 respectively, that occur when the crankshaft angle is increasing from 20° to 180° ATDC in a combustion stroke interval of the No. 1 cylinder.

The same sequence of operations is then performed in each of the succeeding combustion stroke intervals of the No. 2 cylinder, No. 3 cylinder and No. 4 cylinder.

Figure 14:
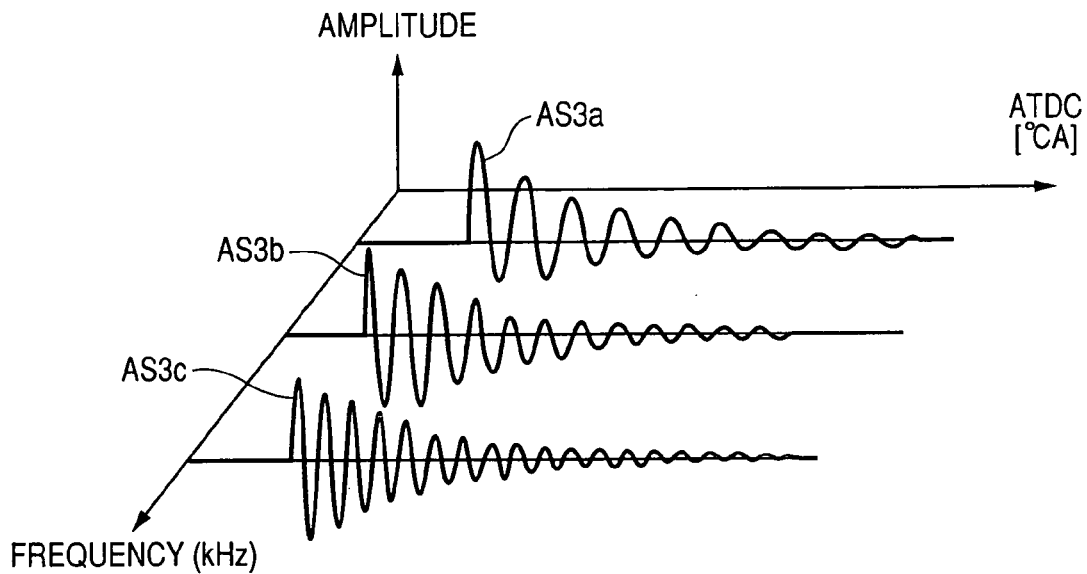
FIG. 14 is a 3-dimensional graph illustrating the waveforms of respective filter output signals produced from the bandpass filters of the third embodiment.

FIG. 14 is a 3-dimensional graph illustrating the output signals from the bandpass filters 304a, 304b, 304c during one combustion stroke interval, with the respective output signals designated as AS3a, AS3b and AS3c. With this embodiment, respective waveform profiles of the output signals produced from the bandpass filters 304a, 304b, 304c during occurrence of engine knocking are stored beforehand in a non-volatile memory in the knocking judgement section 307, as described for the case of a single bandpass filter with the first embodiment. During operation of the third embodiment, in each combustion stroke interval, respective signal waveform profiles are acquired from the output signals of the bandpass filters 304a, 304b, 304c during approximately the first 60° of crankshaft rotation after TDC. In the remaining 120° of crankshaft rotation in that combustion stroke interval, the newly acquired profiles are compared in the knocking judgement section 307 with their respectively corresponding stored profiles.

With this embodiment, if the correlation between at least one of the newly acquired profiles has a degree of correlation with its corresponding stored profile that exceeds a predetermined level, then the knocking judgement section 307 judges that knocking is occurring. In that case, as described for the preceding embodiments, processing such as delaying the engine ignition timing can be performed by an apparatus such as an engine control unit that receives knocking judgement information from the knocking judgement section 307.

It will be apparent that the resolution with which the center frequencies of the bandpass filters 304a, 304b, 304c are successively lowered in each combustion stroke interval, with this embodiment, could be increased by using a greater number of different sets of filter coefficients in accordance with increases in the crankshaft angle after TDC. That is, whereas the embodiment has been described for using three sets of coefficients for each digital bandpass filter (e.g., the set A1, B1, C1 for the bandpass filter 304a as shown in FIG. 13), it would be equally possible to use a greater number of such sets of coefficients for each bandpass filter, respectively corresponding to smaller increments of crankshaft angle than the 10° increments described above. In that way, the variation of the center frequency of each bandpass filter could be made to more accurately follow the successive changes in the knocking frequencies FR1, FR2, FR3, as the crankshaft angle advances.

As can be understood from the above, in addition to the effects (2), (3) described for the first and second embodiments, the third embodiment further provides the following effect:

(4) A plurality of bandpass filters 304a, 304b, 304c, whose passbands can be respectively varied, are used to perform bandpass filtering of the sensor signal BS, with the center frequencies of these bandpass filters 304a, 304b, 304c respectively corresponding to the knocking frequencies FR1, FR2, FR3 of FIG. 1. During each combustion stroke interval of the engine, as the crankshaft advances from the TDC position, the respective center frequencies of the bandpass filters 304a, 304b, 304c are shifted to successively lower values, such that these center frequencies are maintained approximately in correspondence with the knocking frequencies FR1, FR2, FR3. As a result, judgement as to whether knocking is occurring can be made based on the respective output signals from the bandpass filters 304a, 304b, 304c, rather than upon only the output from a single bandpass filter corresponding to one of the knocking frequencies FR1, FR2, FR3. Hence, the accuracy and reliability of knocking judgement can be increased.

The following modifications could be envisaged for the above embodiments. Firstly, with each of the above embodiments, the center frequency of one or more bandpass filter is varied as the engine crankshaft angle increases from the TDC position in a combustion stroke interval of the engine, so that the center frequency can follow the changes in knocking frequency (i.e., a frequency at which a maximum amplitude of vibration occurs during knocking). However it would be equally possible to alter the respective bandwidths of such bandpass filters, in accordance with advancement of the crankshaft angle. Generally, during a combustion stroke in an internal combustion engine, the amplitude of vibration due to knocking is at a maximum when combustion begins, and will thereafter decrease as the crankshaft angle advances from the TDC position. If the bandwidth of the bandpass filter(s) is fixed, then as the amplitude of the knocking vibration decreases, the S/N ratio of the bandpass filter output signal will accordingly become lower. Thus in general, if the bandpass filter bandwidth is held fixed, the S/N ratio of the filter output signal will become lower as the crankshaft angle advances from the TDC position.

Figure 15:
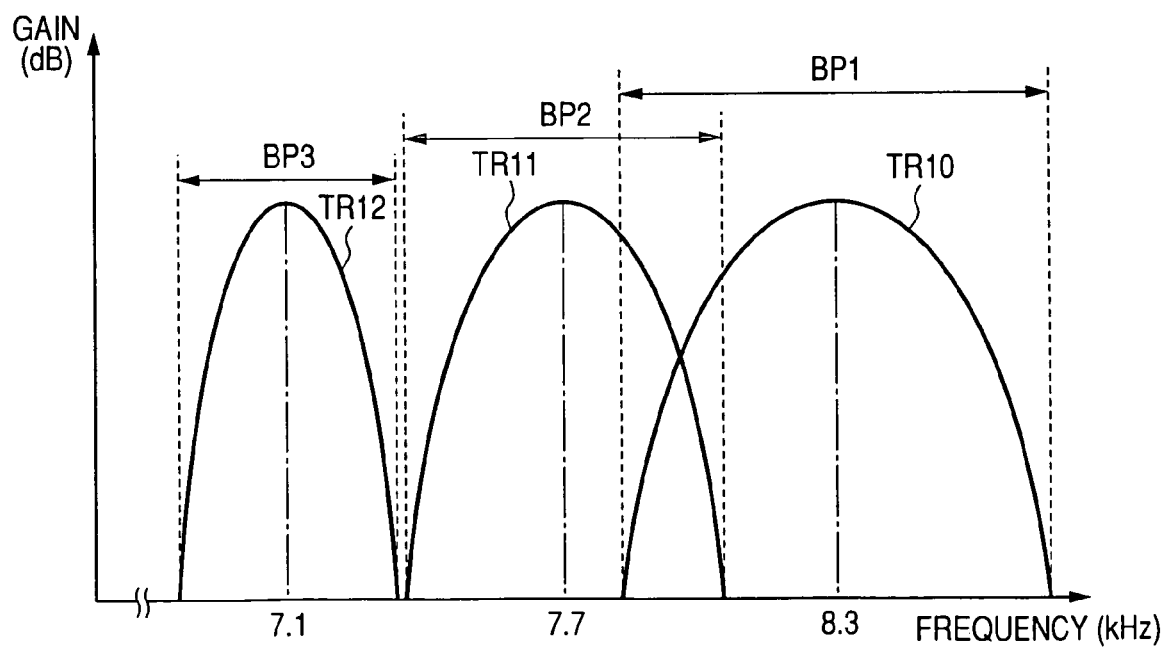
FIG. 15 is a graph showing passband characteristics of a bandpass filter in an alternative embodiment, in which the filter bandwidth is successively altered in conjunction with changes in filter center frequency.

For that reason, the first embodiment described above could be modified to successively change the bandwidth of the selected bandpass filter in accordance with the lowering of the center frequency of the filter. This is illustrated in FIG. 15, in which the passbands TR10, TR11, TR12 of the bandpass filters 101a, 101b, 101c have the respective bandwidths BP1, BP2, BP3, which successively decrease as shown.

In that way, the S/N ratio of the filter output signal AS1 can be maintained at an appropriate level, as the crankshaft angle advances from TDC and the center frequency of bandpass filtering by the bandpass filter set 101 is successively lowered.

It should be noted that in some cases, the S/N ratio of the filter output signal (if the bandpass filter bandwidth is held fixed) will increase as the crankshaft angle advances from the TDC position, i.e., may be excessively low when the crankshaft angle is small. In such a case, the bandpass filters 101a, 10b, 101c can be configured to have respective bandwidths BP1, BP2, BP3, which successively increase, with the passband TR10 having the smallest bandwidth and the passband TR12 having the largest bandwidth.

Figure 16:
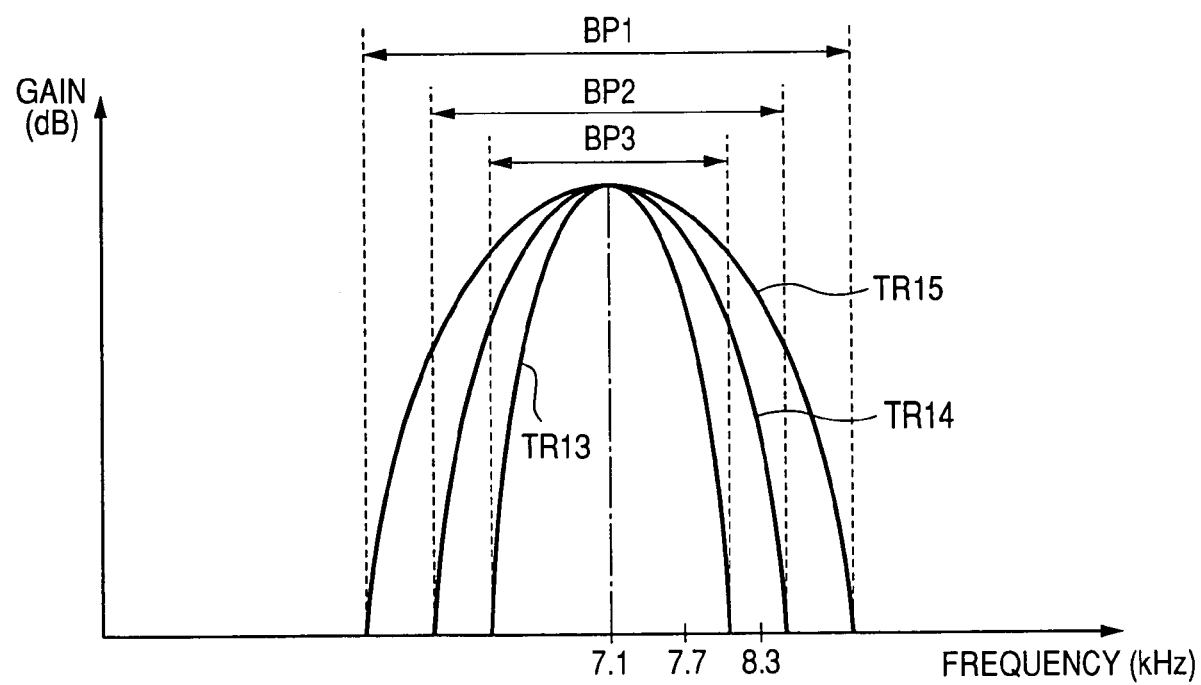
FIG. 16 is a graph showing passband characteristics of a bandpass filter in another alternative embodiment, in which the filter bandwidth is successively altered in according with crankshaft angle advancement, with the filter center frequency held fixed.

Furthermore with the above embodiments, the center frequency of the bandpass filter(s) is varied in order to alter the filter passband characteristic. However as illustrated in FIG. 16, it would be equally possible to leave the center frequency unchanged, and to vary only the bandwidth of a bandpass filter, i.e., with the bandwidth successively decreasing from BP1 to BP3 as the crankshaft angle advances from the TDC position. That is to say, the bandpass filter set 101 of FIG. 1 for example would be replaced by a single variable-bandwidth bandpass filter. As can be understood from FIG. 16, the design of such a variable bandpass filter can be based on the following points:

(a) The center frequency of the filter should be set at a value of knocking frequency (as defined hereinabove) that occurs when the crankshaft angle has advanced by a substantial amount (e.g., to a position within the range 30° to 40° after TDC, with the example of FIG. 1, so that the center frequency is set at 7.1 kHz).

(b) The maximum bandwidth (BP1) should be made sufficiently wide to include an entire range of successive values of knocking frequency that occur during a combustion stroke interval, e.g., from 7.1 to 8.3 kHz.

In that way, as the crankshaft angle advances from the TDC position in a combustion stroke interval, appropriate filter bandwidths BP1, BP2, BP3 are successively selected.

Alternatively, a variable-bandwidth bandpass filter can be utilized, but with the center frequency fixed at a knocking frequency that has been estimated (based on theoretical calculations) to occur when the crankshaft angle has advanced by only a small amount from TDC in a combustion stroke interval, e.g., is within the range TDC to 10°.

The respective values of bandwidth (BP1, BP2, BP3) are then established based on measuring respective frequencies at which peak amplitudes occur when the crankshaft angle has advanced by the corresponding amount from TDC (e.g., peak amplitudes found within the ranges TDC to 10°, 10° to 20°, and 20° to 30°, respectively). The sizes of the respective bandwidths (BP1, BP2, BP3) can then be set, in accordance with their respective corresponding crankshaft angle advancement positions, to each contain frequencies at which peak (knocking vibration) amplitudes corresponding to these crankshaft angle advancement positions occur.

It would be possible to apply the above concept of utilizing a bandpass filter having a fixed center frequency and variable bandwidth to modify the third embodiment, having a plurality of bandpass filters having different center frequencies, respectively corresponding to different knocking frequencies such as FR1 to FR3 described above. In that case the respective bandwidths of the bandpass filters (e.g., the bandpass filters 304a, 304b, 304c of the third embodiment) would be successively altered concurrently, as the crankshaft angle advances, as described above referring to FIG. 16, with the respective center frequencies of these filters held fixed.

Moreover although he third embodiment has been described for the case in which respective single digital bandpass filters are provided, corresponding to different knocking frequencies such as FR1 to FR3 in FIG. 1, with the center frequency of each bandpass filter being controllably adjusted, it would be equally possible to utilize respective sets of two or more bandpass filters, with each set corresponding to a specific one of these knocking frequencies, and with the filters in each set having fixed center frequencies that are respectively different. In that case, filters having successively lower values of center frequency, of each set, would be sequentially selected as the crankshaft angle advances from the TDC position in a combustion stroke interval, in the same manner as described for the bandpass filter set 101 of the first embodiment.

Specifically, the first embodiment shown in FIG. 2 could be modified to replace the single set of bandpass filters 101a, 10b, 101c corresponding to the knocking frequency FR1 of FIG. 1, with three sets of bandpass filters, respectively corresponding to the knocking frequencies FR1, FR2, FR3 of FIG. 1. Three sets of control signals would be respectively supplied to these three sets of bandpass filters from the controller 103, so that each set is controlled in the same manner as has been described above for the bandpass filter set 101. Since the operation of such a modified embodiment will be apparent from the above descriptions of the first and third embodiments, detailed description is omitted.

With such a modified embodiment, the operation of the knocking judgement section 108 can be modified as described for the third embodiment, i.e., to judge that knocking is occurring if at least one of the filtered signals from the plurality of sets of bandpass filters satisfies some predetermined criteria, for example a waveform profile whose correlation with a stored (knocking occurrence) waveform profile has a degree of correlation that exceeds a predetermined threshold.

Although the above embodiments have been described for the case of utilizing signal waveform profiles for judging whether knocking is occurring, it would be equally possible to base the judgement upon whether the amplitude of the filter output signal exceeds a predetermined threshold value.

Furthermore, taking for example the knocking frequencies FR1, FR2, FR3 shown in FIG. 1, the frequency range within which the highest amplitude of vibration occurs will vary in accordance with the speed of rotation of the engine. Hence, it would be possible to provide a knocking detection apparatus having a plurality of bandpass filters with respective center frequencies corresponding to the knocking frequencies FR1, FR2, FR3, and to select the appropriate bandpass filter in accordance with the engine speed of rotation.

It should be noted that each of the function blocks shown in the block diagram of the above embodiments could be implemented either by software processing (i.e., by operating a microprocessor under a suitable control program) or in hardware form. The essential point is that the passband of bandpass filtering is varied, during crankshaft angle advancement in each combustion stroke interval, to follow the frequency changes which occur in at least one sensor signal component that is characteristic of knocking, during that combustion stroke interval.

Furthermore although the above embodiments have been described for the case in which a single knocking sensor is utilized, it would be equally possible to provide respective knocking sensors for each of the engine cylinders. The respective sensor signals could for example be multiplexed, with each being selected to be inputted to the knocking detection apparatus during each combustion stroke interval of the corresponding cylinder. It will be understood that in this case, the operation of each embodiment would be similar to that described above for the case of a single knocking sensor.

What is claimed is:

1. An engine knocking detection apparatus coupled to receive a sensor signal from a knocking sensor that detects vibration of an internal combustion engine, the apparatus comprising:

bandpass filter means for filtering said sensor signal to select a knocking frequency component that has a local maximum vibration amplitude whose frequency varies with crank angle and is within a frequency range that is specific to occurrence of knocking in said internal combustion engine, and knocking judgment means coupled to receive a filtered signal produced from said bandpass filter means, for judging whether or not engine knocking is occurring, based on said filtered signal;

wherein said engine knocking detection apparatus comprises filter control means for successively adjusting a passband of said bandpass filter means during one combustion stroke interval of said interval combustion engine to track frequency changes that occur in said knocking frequency component as a function of only the absolute crank angle during said one combustion stroke interval of said internal combustion engine.

2. An engine knocking detection apparatus according to claim 1, wherein:
said filter control means successively adjusts said passband in accordance with increasing crankshaft angle of said internal combustion engine from a TDC (top dead center) position in said combustion stroke interval.

3. An engine knocking detection apparatus according to claim 2, wherein:
said filter control means adjusts said passband by successively altering a center frequency of said passband.

4. An engine knocking detection apparatus according to claim 3 wherein:
said bandpass filter means comprises a plurality of bandpass filters having respectively different center frequencies, and
during said combustion stroke interval, said filter control means successively selects respective ones of said bandpass filters to provide said filtered signal to said knocking judgment means, with said selection being performed in a sequence of decreasing values of center frequency of said bandpass filters.

5. An engine knocking detection apparatus according to claim 4 wherein:
said plurality of bandpass filters have respectively different bandwidths.

6. An engine knocking detection apparatus according to claim 5 wherein:
said bandwidths are respectively predetermined in accordance with known changes in said knocking frequency component, as said crankshaft angle increases from said TDC position.

7. An engine knocking detection apparatus according to claim 3 wherein:
said bandpass filter means comprises a plurality of bandpass filter sets respectively corresponding to a plurality of knocking frequency components within respective ones of a plurality of frequency ranges that are each specific to occurrence of knocking;
each said filter set comprises a plurality of bandpass filters having respectively different center frequencies;
during said combustion stroke interval said filter control means successively selects respective ones of said bandpass filters of each of said bandpass filter sets, with each said selected bandpass filter supplying a corresponding filtered signal to said knocking judgment means; and
said selection is performed in order of sequentially decreasing values of center frequency of said bandpass filters.

8. An engine knocking detection apparatus according to claim 7 wherein:
said knocking judgment means judges that knocking is occurring when at least one of said filtered signals supplied from said sets of bandpass filters meets a predetermined condition.

9. An engine knocking detection apparatus according to claim 3 wherein:
said bandpass filter means comprises a bandpass filter that is controllable for adjustment of a center frequency thereof, and
said filter control means controls said bandpass filter to adjust said center frequency to successively lower values in accordance with increasing crankshaft angle from said TDC position during said combustion stroke interval.

10. An engine knocking detection apparatus according to claim 3 wherein:
said bandpass filter means comprises a plurality of bandpass filters having respectively different center frequencies, with each said bandpass filter controllable for adjustment of a center frequency thereof;
said bandpass filters respectively correspond to a plurality of knocking frequency components within respective ones of a plurality of frequency ranges that are each specific to occurrence of knocking; and
during said combustion stroke interval, said filter control means successively controls each of said plurality of bandpass filters to adjust said center frequency thereof to successively lower values in accordance with increasing of said crankshaft angle from said TDC position during said combustion stroke interval, with each said bandpass filter supplying a corresponding filtered signal to said knocking judgment means.

11. An engine knocking detection apparatus according to claim 10 wherein:
said knocking judgment means judges that knocking is occurring when at least one of said filtered signals respectively supplied from said sets of bandpass filters meets a predetermined condition.

12. An engine knocking detection apparatus according to claim 3, wherein:
said filter control means further alters a bandwidth of said passband of said bandpass filter means in accordance with increasing crankshaft angle from said TDC position during said combustion stroke interval.

13. An engine knocking detection apparatus according to claim 2, wherein:
said adjustment of said passband of said bandpass filter means by said filter control means comprises successively altering a bandwidth of said passband.

14. An engine knocking detection apparatus according to claim 13, wherein: said bandpass filter means comprises a plurality of bandpass filters, corresponding to respective ones of a plurality of knocking frequency components that are respectively within a plurality of frequency ranges each specific to occurrence of knocking.

15. An engine knocking detection apparatus according to claim 1, wherein:
said knocking judgment means performs said judgment based upon a degree of correlation between (a) a specific waveform profile of said filtered signal from said bandpass filter, derived beforehand during occurrence of knocking, and (b) a currently derived waveform profile of said filtered signal, and determines that knocking is occurring when said degree of correlation is above a predetermined level.

16. An engine knocking detection apparatus according to claim 15, wherein said knocking judgment means comprises:
a non-volatile memory having said specific waveform profile stored therein beforehand, derived within a specific interval of crankshaft angle advancement in a combustion stroke interval during occurrence of said knocking;
profile derivation means for deriving said currently derived waveform profile of said filtered signal from said bandpass filter means, derived within said specific interval in each of respective combustion stroke intervals during operation of said engine knocking detection apparatus;
means for calculating a correlation coefficient expressing a degree of correlation between said stored specific waveform profile and said waveform profile of said currently derived filtered signal; and means for detecting occurrence of said knocking, based upon a magnitude of said correlation coefficient.

17. An engine knocking detection apparatus according to claim 1, wherein said filter control means successively adjusts a filter passband during each of plural combustion stroke intervals of said internal combustion engine.

18. A method for detecting internal combustion engine knocking based on an engine vibration sensor signal, said method comprising:
passband frequency filtering an engine vibration sensor signal within a frequency range associated with occurrence of knocking in said internal combustion engine,
varying a passband parameter of said passband frequency filtering to track expected engine knocking frequency changes that occur as a function of only the absolute crank angle during one combustion stroke interval of the internal combustion engine; and
judging whether or not engine knocking is occurring based on the varied passband parameter filtered signal.

19. A method as in claim 18 wherein:
said passband parameter is varied in accordance with increasing crankshaft angle of said internal combustion engine from a TDC (top dead center) position in said combustion stroke interval.

20. A method as in claim 19 wherein:
said passband parameter is varied by altering a center frequency of said passband.

21. A method as in claim 20 wherein:
a plurality of bandpass filters having respectively different center frequencies are used, and
during said combustion stroke interval, respective ones of said bandpass filters are successively selected to filter the sensor signal, with said selection being performed in a sequence of decreasing center frequency values.

22. A method as in claim 21 wherein:
the plurality of bandpass filters have respectively different bandwidths.

23. A method as in claim 22 wherein:
said bandwidths are respectively predetermined in accordance with known changes in a knocking frequency component as said crankshaft angle increases from said TDC position.

24. A method as in claim 20 wherein:
a plurality of bandpass filter sets are used which respectively correspond to a plurality of knocking frequency components within respective ones of a plurality of frequency ranges that are each specific to occurrence of knocking;
a plurality of bandpass filters in each said set having respectively different center frequencies; and
during said combustion stroke interval, successively selecting respective ones of said bandpass filters of each of said sets, with each selected bandpass filter supplying a corresponding filtered signal; and
said selection being performed in order of sequentially decreasing values of center frequency of said bandpass filters.

25. A method as in claim 24 wherein:
said knocking is judged to be occurring when at least one filtered signal supplied from said sets of bandpass filters meets a predetermined condition.

26. A method as in claim 20 wherein:
said passband frequency filtering is performed using a bandpass filter with an adjustable center frequency which is varied to successively lower values in accordance with increasing crankshaft angle from said TDC position during said combustion stroke interval.

27. A method as in claim 20 wherein:
said passband frequency filtering is performed using a plurality of bandpass filters having respectively different center frequencies, with each said bandpass filter having a controllably adjustable center frequency, said bandpass filters respectively corresponding to a plurality of knocking frequency components within respective ones of a plurality of frequency ranges associated with the occurrence of knocking; and
during said combustion stroke interval, successively controlling the center frequency of each of said plurality of bandpass filters to successively lower values in accordance with increasing crankshaft angle from said TDC position during said combustion stroke interval, with each said bandpass filter supplying a corresponding filtered signal for use in judging the occurrence of engine knocking.

28. A method as in claim 27 wherein:
said knocking is judged to be occurring when at least one filtered signal respectively supplied from said sets of bandpass filters meets a predetermined condition.

29. A method as in claim 20 wherein:
a bandwidth of said passband filtering is controlled in accordance with increasing crankshaft angle from said TDC position during said combustion stroke interval.

30. A method as in claim 19 wherein:
said passband filtering is varied by successively altering a passband bandwidth.

31. A method as in claim 30 wherein:
said passband filtering uses a plurality of bandpass filters, corresponding to respective ones of a plurality of knocking frequency components that are respectively within a plurality of frequency ranges, each range being associated with occurrence of engine knocking.

32. A method as in claim 18 wherein:
judgment of an occurrence of knocking is based upon a degree of correlation between (a) a specific waveform profile of a passband filtered signal derived during occurrence of knocking, and (b) a currently derived waveform profile of said passband filtered signal, and knocking is determined as occurring when said degree of correlation is above a predetermined level.

33. A method as in claim 32 wherein said judgment comprises:
storing said specific waveform profile in a non-volatile memory derived within a specific interval of crankshaft angle advancement in a combustion stroke interval during occurrence of said knocking;
deriving said currently derived waveform profile of a filtered signal within said specific interval in said combustion stroke interval;
calculating a correlation coefficient expressing a degree of correlation between said stored specific waveform profile and said waveform profile of said currently derived filtered signal; and
detecting occurrence of said knocking, based upon a magnitude of said correlation coefficient.

34. A method as in claim 18 wherein said varying step is performed during each of plural combustion stroke intervals of said internal combustion engine.

* * * * *